United States Patent [19]
Boege et al.

[11] Patent Number: 5,924,214
[45] Date of Patent: Jul. 20, 1999

[54] LENGTH MEASURING APPARATUS FOR MEASURING THE RELATIVE POSITION OF TWO OBJECTS

[75] Inventors: Ludwig Boege; Hans Joachim Freitag, both of Jena, Germany

[73] Assignee: Dr. Johannes Heidenhain GmbH, Traunreut, Germany

[21] Appl. No.: 08/860,262

[22] PCT Filed: Nov. 18, 1996

[86] PCT No.: PCT/EP96/05078

§ 371 Date: Jun. 26, 1997

§ 102(e) Date: Jun. 26, 1997

[87] PCT Pub. No.: WO97/19324

PCT Pub. Date: May 29, 1997

[30] Foreign Application Priority Data

Nov. 23, 1995 [DE] Germany ............... 195 43 647

[51] Int. Cl.⁶ .................................................. G01B 7/04
[52] U.S. Cl. ................................................... 33/706
[58] Field of Search ................ 33/702, 704, 706, 33/707, 708

[56] References Cited

U.S. PATENT DOCUMENTS

| | | | |
|---|---|---|---|
| 4,152,837 | 5/1979 | Nelle et al. | 33/706 |
| 4,198,757 | 4/1980 | Nelle et al. | 33/704 |
| 4,569,137 | 2/1986 | Ichikawa | 33/706 |
| 4,776,098 | 10/1988 | Nelle | 33/706 |
| 4,791,289 | 12/1988 | Watanabe et al. | 356/374 |
| 5,050,311 | 9/1991 | Nelle | 33/704 |
| 5,065,525 | 11/1991 | Szenger | 33/704 |
| 5,157,846 | 10/1992 | Fromme | 33/704 |
| 5,182,867 | 2/1993 | Nelle | 33/702 |
| 5,375,338 | 12/1994 | Nelle | 33/704 |
| 5,488,782 | 2/1996 | Ochiai | 33/706 |
| 5,551,163 | 9/1996 | Affa | 33/706 |
| 5,611,148 | 3/1997 | Affa | 33/706 |
| 5,655,311 | 8/1997 | Affa | 33/706 |

FOREIGN PATENT DOCUMENTS

| | | |
|---|---|---|
| 7507398 | 3/1975 | Germany . |
| 2611459 | 9/1978 | Germany . |
| 2810341 | 1/1980 | Germany . |
| 8525587 | 2/1987 | Germany . |
| 3908260 | 5/1990 | Germany . |

*Primary Examiner*—G. Bradley Bennett
*Attorney, Agent, or Firm*—McAulay Nissen Goldberg Kiel & Hand, LLP

[57] ABSTRACT

In a length measurement device for measuring the relative position of two objects in which a scale is connected with one object via retaining elements and the ruling of the scale is sensed by a sensing unit formed of a measurement head and a measurement carriage, wherein the sensing unit is coupled to the other object via a coupling point by drivers which are constructed as a deflectable, elastic coupling device. The coupling device is fastened to the measurement carriage at two connection locations, wherein the coupling point is arranged between these connection locations for coupling the sensing unit to the other object.

7 Claims, 3 Drawing Sheets

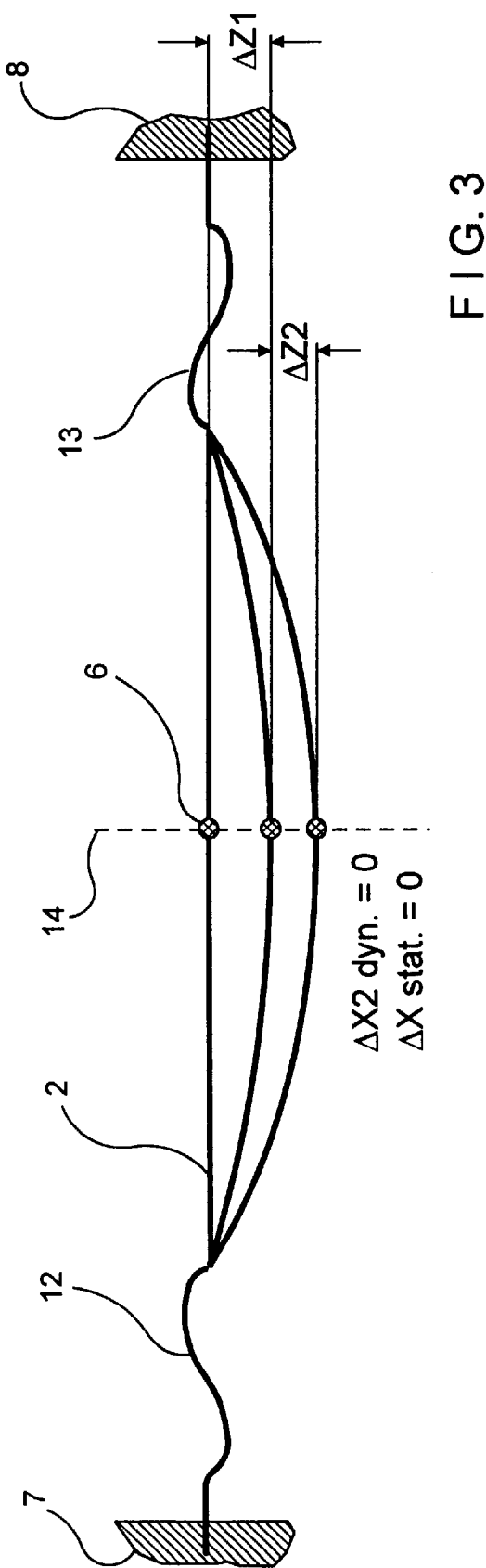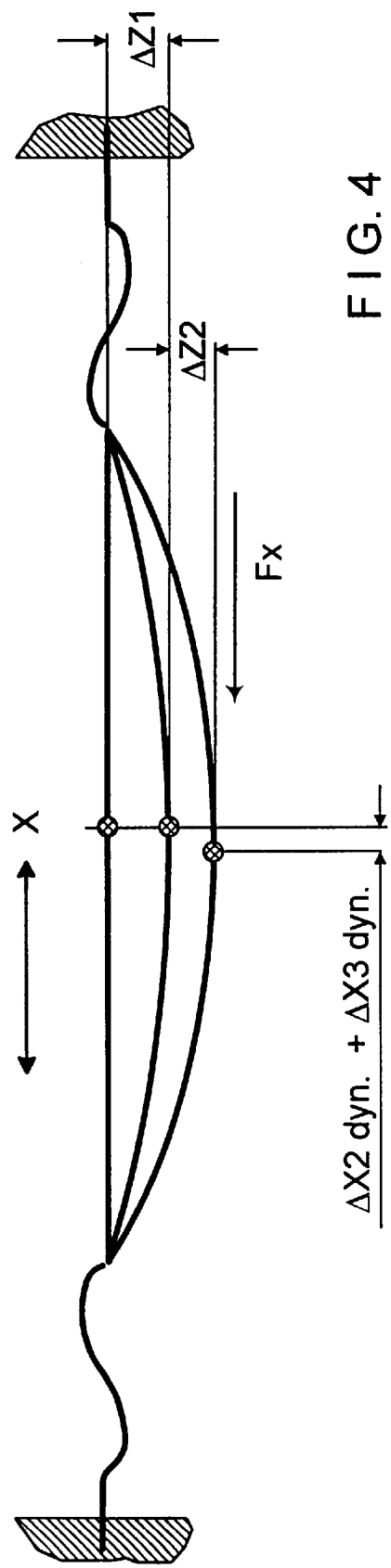

LENGTH MEASURING APPARATUS FOR MEASURING THE RELATIVE POSITION OF TWO OBJECTS

BACKGROUND OF THE INVENTION a) Field of the Invention

The invention is directed to a length measurement device for measuring the relative position of two objects in which a scale is connected with one object via retaining elements and the ruling of the scale is sensed by a sensing unit formed of a measurement head and a measurement carriage, wherein the sensing unit is coupled to the other object via a coupling point by means of drivers which are constructed as a deflectable, elastic coupling device. Such length measurement devices are used, for example, as combination positioning and measuring devices in machine tool construction and in mechanical engineering in general.

b) Description of the Related Art

Numerous measurement devices in which the relative movements of two mechanical structural component parts, for instance, are measured with high accuracy are known from the prior art. Strict requirements are imposed on the guidance of the sensing unit as regards positional tolerances as well as torsional or rotational tolerances. In machine tool construction, machine guides do not meet these strict requirements, so that the sensing unit is normally accommodated in a special measurement carriage which is guided on an auxiliary guide within the measurement system and is oriented to the scale. In order to balance or compensate the guide paths of the two guides relative to one another, coupling members are arranged in the measuring direction between the driver, which is securely fastened to the first machine element, and the measurement carriage which runs on the auxiliary guide in the measurement system.

DE-PS 39 08 260 discloses an arrangement in which a ball is located between a plane surface at the measurement carriage and another plane surface at the driver, this ball being held in contact with the contact faces by means of a spring. The frictionally engaging coupling compelled by the spring requires high spring forces on the one hand and, on the other hand, hardened contact faces between the ball and driver and between the ball and measurement carriage in order to reduce Hertzian flattening. Beyond this, the manufacturing and adjustment requirements for aligning the contacting surface extending vertical to the measurement direction and for keeping within the measured value error limits are relatively elaborate.

DE-PS 28 10 341 describes another type of length measurement device in which a coupling element in the form of a wire is arranged between the driver and the measurement carriage. The coupling element is clamped by one end at the driver and by the other end at the measurement carriage. When compensating for guidance errors, the coupling point moves in an approximately circular path with the radius of the coupling wire length. The resulting measurement errors depend to a decisive extent upon the position of the coupling point corresponding to the attaching or mounting tolerances of the measurement system at a machine part.

The longitudinal stiffness of the coupling element drops sharply in the case of large deflections, which results in measurement errors, particularly with large dynamic loads and with reversals in the measurement direction.

OBJECT AND SUMMARY OF THE INVENTION

Based on the prior art described above, the object of the primary invention is to provide a highly accurate length measurement device for measuring the relative position of two objects which is simply designed, easy and inexpensive to manufacture, and ensures an outstandingly effective transmitting movement between the driver and sensing device and accordingly guarantees a high measuring accuracy.

According to the invention, this object is met in a length measurement device of the type mentioned above in that the coupling device is arranged at a measurement carriage of the sensing unit at two connection locations and the coupling point is arranged between these connection locations for coupling the sensing unit with the other object. The connection locations are preferably fixedly connected with the measurement carriage.

In accordance with a preferred construction of the invention, the coupling point is arranged at a point where the resultant spring constants between this point and one connection location and between this point and the other connection location are approximately equal.

In another advantageous further development of the invention, the coupling device contains elongation zones which advantageously extend (in the longitudinal direction) in a sine-shaped or cosine-shaped manner.

It is further advantageous in a length measurement device according to the invention when the coupling device has different cross sections in the direction along its length between the two connection locations.

In another advantageous construction of the invention, the cross sections of the coupling device between the connection locations in the longitudinal direction have identical cross-sectional surfaces and/or cross-sectional shapes at an equal distance from the coupling point.

In a particularly preferred construction of the invention, the coupling device is formed of spring steel.

In the following, the invention is explained in principle more fully by way of example with reference to the drawing.

BRIEF DESCRIPTION OF THE DRAWINGS

In the drawings:

FIG. 3 is a schematic view of an embodiment form of the measurement device according to the invention shown in the dynamic state; and FIG. 4 is a schematic view of another embodiment form of the measurement device according to the invention shown in the dynamic state.

DESCRIPTION OF THE PREFERRED EMBODIMENTS

Figure 1:
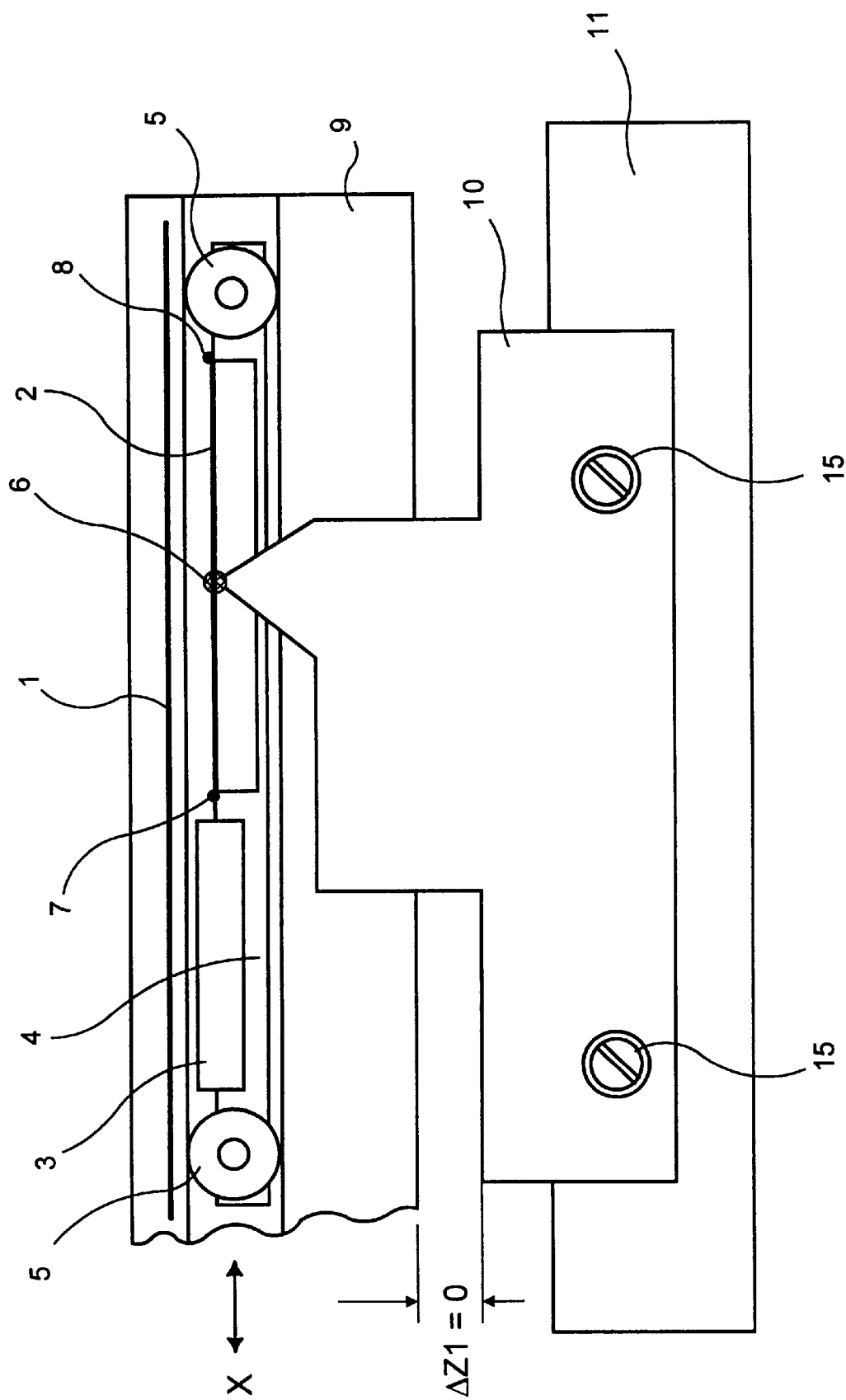
FIG. 1 is a schematic view of the length measurement device according to the invention.

In the length measurement device shown schematically in FIG. 1, a scale 1 is connected with an object 9 via retaining elements (not shown). A sensing unit including a measurement head 3, a measurement carriage 4, and two rollers 5 slides in a groove in the object 9 during the measuring process.

A coupling device 2 is securely connected at both sides with the measurement carriage 4 by two connection locations 7, 8. The connection locations 7, 8 are realized by means of types of fastening which are conventional in general in precision mechanical engineering, e.g., laser welds. However, the connection locations 7, 8 can also be formed by positive-engagement connections if necessary.

A driver 10 which is fastened to another object 11 by suitable connection elements, e.g., screws 15, is connected in a positive engagement with the coupling device 2 by way of a coupling point 6. This coupling point 6 can also be produced, e.g., by laser welding.

The coupling device 2 shown in FIG. 1 varies in cross section in the longitudinal direction x between the connection locations 7 and 8. Accordingly, with uniform material thickness, the coupling device is provided with a widening at several locations so that the bending stress in the coupling device is reduced in the widened region.

However, regardless of the shape of the cross section, there must always be an identical resultant spring constant at the coupling point 6. Spring steel, e.g., CrMo steel, is preferably used as material for the coupling device 2.

Owing to mounting tolerances of the measurement system, the distance between the driver 10 and object 9 will vary in the stationary state. At $\Delta z1=0$, the deflectable, elastic coupling device 2 is found in its undeflected zero position (starting position).

Figure 2:
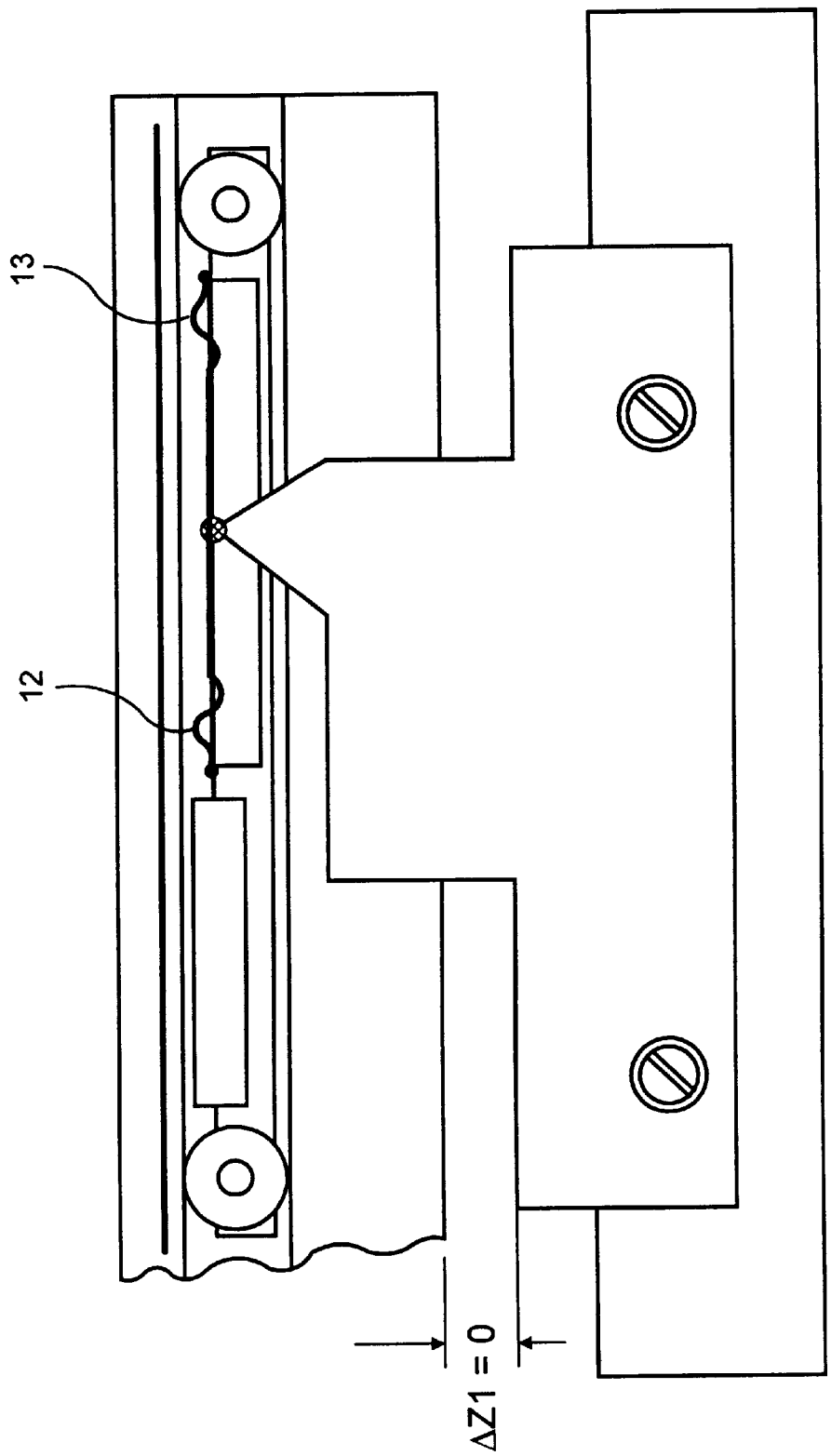
FIG. 2 shows another embodiment form of the length measurement device according to the invention.

FIG. 2 shows another embodiment form for the length measurement device according to the invention in which, unlike the embodiment form according to FIG. 1, the coupling device 2 has two elongation zones 12 and 13 which are advantageously formed in a sine-shaped or cosine-shaped manner. It is also possible to use other shapes if it is ensured that the coupling point 6 is arranged at a point, as in FIG. 1, where the resultant spring constants between this point and one connection location 7 on the one hand and between this point and the other connection location 8 on the other hand are approximately equal. Permissible deviations/differences in the spring constants are given by the permitted measurement error tolerances.

The embodiment form of a measuring device which is only shown schematically in FIG. 3 shows a shifting of the coupling point 6 by an amount $\Delta z1$. In the dynamic state, that is, as the sensing unit traverses in the object 7 during measurement, there is a further displacement of the coupling point 6 by an amount $\Delta z2$, this displacement being brought about by straight and sagging portions in the capsule or enclosure. Due to the fixed connection of the deflectable elastic coupling device 2 at both sides and the symmetrical position of the coupling point 6 with respect to the spring constants, the shifting of the coupling point 6 by $\Delta z1$ and $\Delta z2$ takes place along a straight line 14 perpendicular to the connecting line between the connection locations 7 and 8. The measurement error is accordingly given by the equation $\Delta x2_{dyn}=0$ and no measurement error occurs.

If a movement direction such as that shown in FIG. 4 occurs, there results an acceleration force Fx and, accordingly, a measurement error of only $\Delta x3_{dyn}$.

In order to decrease bending stresses in the deflectable, elastic coupling device 2 ($\Delta z1$, $\Delta z2$), the elongation zones 12, 13 are formed e.g., sinusoidally and the cross section of the coupling device 2 is so dimensioned that a given permissible measurement error brought about by the acceleration force Fx is not exceeded. Accordingly, a minimum stiffness is ensured in the longitudinal direction x (movement direction).

While the foregoing description and drawings represent the present invention, it will be obvious to those skilled in the art that various changes may be made therein without departing from the true spirit and scope of the present invention.

What is claimed is:

1. A length measurement device for measuring the relative position of two objects comprising:

a scale being connected with one object via retaining elements;

a sensing unit for sensing the ruling of the scale, said sensing unit being formed of a measurement head and a measurement carriage;

said sensing unit being coupled to the other object via a single coupling point by a deflectable, elastic coupling device;

said coupling device being arranged at the measurement carriage of the sensing unit to two connection locations;

said single coupling point being arranged between said connection locations for coupling the sensing unit to the other object; and the coupling point being chosen such that the resultant spring constants of said coupling device between the coupling point and one connection location and between the coupling point and the other connection location are approximately equal.

2. The length measurement device according to claim 1, wherein the connection locations of the coupling device are fixedly connected with the measurement carriage.

3. The length measurement device according to claim 1, wherein the coupling device contains elongation zones.

4. The length measurement device according to claim 3, wherein the elongation zones are sinusoidal in a longitudinal direction.

5. The length measurement device according to claim 1, wherein the coupling device varies in cross section in the longitudinal direction between the two connection locations.

6. The length measurement device according to claim 1, wherein the cross sections between the connection locations in the longitudinal direction have identical cross-sectional surfaces and/or cross-sectional shapes at an equal distance from the coupling point.

7. The length measurement device according to claim 1, wherein the coupling device is formed of spring steel.

* * * * *